United States Patent
Ramesh et al.

(10) Patent No.: US 6,391,970 B1
(45) Date of Patent: *May 21, 2002

(54) CLEARCOAT BINDER OF POLYEPOXIDE, POLYACID AND POLYISOCYANATE

(75) Inventors: Swaminathan Ramesh, Canton; Manoj K. Gupta, Troy, both of MI (US)

(73) Assignee: BASF Corporation, Southfield, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/204,442

(22) Filed: Dec. 2, 1998

Related U.S. Application Data

(62) Division of application No. 08/847,568, filed on Apr. 24, 1997, now abandoned.

(51) Int. Cl.⁷ .......................... C08L 33/02; C08L 33/14; C08L 63/00; C08L 67/02
(52) U.S. Cl. ....................... 525/172; 525/208; 525/176; 525/438; 525/528
(58) Field of Search ................................. 525/111, 123, 525/124, 208, 438, 528, 172, 176

(56) References Cited

U.S. PATENT DOCUMENTS

| | | | | |
|---|---|---|---|---|
| 3,969,327 A | * | 7/1976 | Stein et al. | 526/1 |
| 4,093,674 A | * | 6/1978 | Tsutsui et al. | 526/1 |
| 4,346,144 A | * | 8/1982 | Craven | 525/117 |
| 4,650,718 A | * | 3/1987 | Simpson et al. | 528/112 |
| 4,818,791 A | * | 4/1989 | Murakami et al. | 525/124 |
| 4,927,869 A | * | 5/1990 | Dana et al. | 523/502 |
| 5,326,821 A | * | 7/1994 | Sasaki et al. | 525/124 |
| 5,331,050 A | * | 7/1994 | Harper | 525/125 |
| 5,710,214 A | * | 1/1998 | Chou et al. | 525/124 |

FOREIGN PATENT DOCUMENTS

| | | | |
|---|---|---|---|
| JP | 56-118463 | * | 9/1981 |
| JP | 1-98673 | * | 4/1989 |
| JP | 2218766 | * | 8/1990 |
| JP | 3-153771 | * | 7/1991 |
| JP | 5-156582 | * | 6/1993 |
| JP | 7-62295 | * | 3/1995 |

\* cited by examiner

*Primary Examiner*—Robert E. L. Sellers

(57) ABSTRACT

A resinous binder useful in clear coat compositions comprises a) a polyepoxide such as a copolymer of an ethylenically unsaturated epoxide with other (meth)acrylate(s) or styrene, b) a polyacid such as a carboxyl-terminated polyester, and c) a polyisocyanate.

6 Claims, No Drawings

CLEARCOAT BINDER OF POLYEPOXIDE, POLYACID AND POLYISOCYANATE

RELATED APPLICATIONS

This application is a divisional application of U.S. application Ser. No. 08/847,568, filed Apr. 24, 1997, now abandoned.

FIELD OF THE INVENTION

The present invention relates to clear coat systems based on acid epoxy-isocyanate chemistry wherein one or more of the components can be modified such that the system is adapted for different applications.

More particularly, the clear coat systems exhibit dual cross links of ester and urethane which give the system enhanced advantages over clear coats exhibiting only one type of cross linking.

BACKGROUND OF THE INVENTION

Clear coats have become increasingly popular as coatings for painted articles such as automobiles. Not only do clear coats generally have excellent gloss, but they also generally offer enhanced resistance to etching and scratching. While clear coats are desirable, those employing polyisocyanates have presented certain problems in that they are sensitive to moisture. In an attempt to address many of the problems associated with employing polyisocyanates in clear coat systems, U.S. Pat. No. 4,650,718 discloses a cross-linkable coating composition based on polyepoxides and polyacid curing agents. While the resulting compositions are purported to produce cured coatings with excellent adhesion, gloss and the ability to reflect images, they generally fail to provide good humidity and mar resistance. In an attempt to address these concerns, U.S Pat. No. 4,927,868 discloses a curable, liquid coating composition containing an organic solvent and a resinous binder comprising a polyepoxide and a copolymer of an alpha-olefin or cyclolefin and an olefinically unsaturated monoanhydride which may include a partial ester thereof and preferably a polyacid.

In contrast to the present invention, it appears that the compositions of the above-mentioned patents exhibit significant secondary hydroxyl formation during the acid-epoxy reaction which, in turn, may result in the perceived humidity failures. The final thermoset polymer, i.e. clear coat composition, formed under the present invention will have both ester and urethane cross links which will synergistically enhance the properties of each other. As a result, higher equivalent weight epoxies, isocyanates and acid cross linkers can be utilized under the present invention which will generally result in significant cost savings.

Thus, the present invention fulfills a need in the art for coating compositions and, more particularly, clear coat systems which have good mar and etch resistance, a relatively high microhardness, good shelf life stability and are relatively inexpensive to produce.

SUMMARY OF THE INVENTION

The present invention provides for resinous binders useful in clear coat compositions comprising: a) a polyepoxide; b) a polyacid containing at least two carboxyl groups per molecule; and c) a polyisocyanate, wherein said resinous binder exhibits at least ester or urethane cross-linking. The invention further relates to clear coat compositions including an organic solvent and a resinous binder comprising: a) the reaction product of a polyepoxide and a polyacid; and b) an isocyanate reacted with the product of a), wherein said resinous binder exhibits both ester and urethane cross-linking. The invention also provides a process for applying a clear coat composition to a substrate wherein the dual cross-linkable system described above is in the clear coat.

The resinous binders of the clear coat compositions of the present invention are preferably obtained by the reaction of an epoxide with a polyacid to obtain a hydroxy ester which is subsequently reacted with an isocyanate in accordance with the following reaction mechanism:

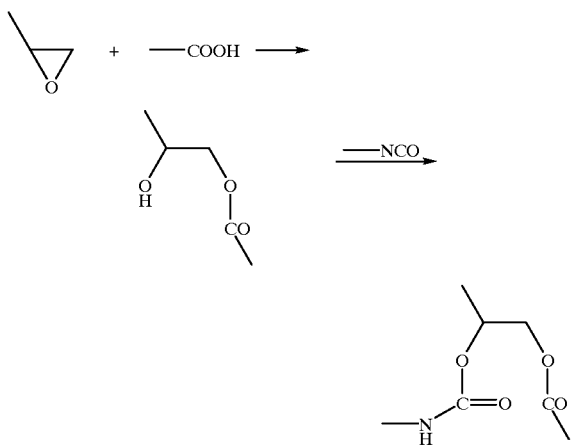

The resulting resinous binder thereby allows for extensive cross-linking including at least ester or urethane cross-linking sites, and preferably both.

DETAILED DESCRIPTION OF THE PREFERRED EMBODIMENT

The essential components of the dual cross-linkable compositions of the present invention are the reaction product of a polyepoxide and a polyacid, and the polyisocyanate.

Among the polyepoxides which can be used are epoxy-containing acrylic polymers such as copolymers of an ethylenically unsaturated monomer having at least one epoxy group and at least one ethylenically unsaturated monomer which is free from epoxy groups. In general, ethylenically unsaturated monomers containing epoxy groups are those including 1,2 epoxy groups such as glycidyl acrylates, glycidyl methacrylates and alkyl glycidyl ethers, among others.

Examples of ethylenically unsaturated monomers which do not contain epoxy groups are alkyl esters of acrylic and methacrylic acid containing from 1 to 20 atoms in the alkyl group. Specific examples of these acrylates and methacrylates are methyl methacrylate, ethyl methacrylate, butyl methacrylate, ethyl acrylate, butyl acrylate and 2-ethylhexyl acrylate.

Examples of other copolymerizable ethylenically unsaturated monomers are vinyl aromatic compounds such as styrene and vinyl toluene; nitrites such as acrylonitrile and methacrylonitrile; vinyl and vinylidene halides such as vinyl chloride and vinylidene fluoride and vinyl esters such as vinyl acetate. Acid group-containing copolymerizable ethylenically unsaturated monomers such as acrylic and methacrylic acid are preferably not used because of the possible reactivity of the epoxy and acid group.

The epoxy group-containing ethylenically unsaturated monomer(s) is preferably used in amounts of from about 5.0 to 60.0, more preferably from 20.0 to 50.0 percent by weight of the total monomers used in preparing the epoxy-containing acrylic polymer. Of the remaining polymerizable ethylenically unsaturated monomers, preferably from 95.0 to 40.0 percent, more preferably from 80.0 to 50.0 percent by weight of the total monomers are the alkyl esters of acrylic and methacrylic acid.

In preparing the epoxy-containing acrylic polymer, the epoxide functional monomers and the other ethylenically unsaturated monomers can be mixed and reacted by conventional free radical initiated organic solution polymerization.

The epoxy-containing acrylic polymer typically has a number average molecular weight between about 1,000 and 30,000, preferably 2,000 to 20,000, more preferably 2,000 to 10,000 with an epoxy equivalent weight of typically from 50–2,000, preferably 100–1,000, and more preferably 200–600. The molecular weight is determined by gel permeation chromatography using a polystyrene standard.

In determining molecular weights in this fashion, it is not the actual molecular weights which are measured but an indication of the molecular weight as compared to polystyrene. The values which are obtained are commonly referred to as polystyrene numbers. However, for the purposes of this invention, they are referred to as molecular weights.

The epoxy condensation polymers which are useful are polyepoxides, i.e., those having a 1,2-epoxy equivalency greater than 1 and up to about 3.0. Examples of such epoxides are polyglycidyl ethers of polyhydric phenols and of aliphatic alcohols. These polyepoxides can be produced by etherification of the polyhydric phenol or aliphatic alcohol with an epihalohydrin such as epichlorohydrin in the presence of alkali.

Examples of suitable polyphenols are 2,2-bis(4-hydroxyphenyl)propane (bisphenol A), 1,1-bis(4-hydroxyphenyl)ethane and 2-methyl-1, 1-bis(4-hydroxyphenyl)propane. Examples of suitable aliphatic alcohols are ethylene glycol, diethylene glycol, 1,2-propylene glycol and 1,4-butylene glycol. Also, cycloaliphatic polyols such as 1,2-cyclohexanediol, 1,4-cyclohexanediol, 1,2-bis(hydroxymethyl)cyclohexane and hydrogenated bisphenol A can also be used.

Besides the epoxy-containing polymers described above, certain polyepoxide monomers and oligomers can also be used. Examples of these materials are those containing the cyclohexane oxide moiety. These polyepoxides are of relatively low molecular weight and of relatively high reactivity, thus, enabling the formation of high solids coating compositions with excellent cure response. The polyepoxides should have an average 1,2-epoxy equivalency of greater than one. The preferred polyepoxides are diepoxides, that is, having a 1,2-epoxy equivalency of two.

Various polyepoxides containing the cyclohexane oxide moiety are known. Particularly preferred in this regard is 3,4-epoxycyclohexylmethyl 3,4-epoxycyclohexane carboxylate. Also, the diepoxide bis(3,4-epoxy-6-methylcyclohexylmethyl) adipate can be used. These epoxides are commercially available from Union Carbide Corporation as ERL 4221 and ERL 4299, respectively. Also, epoxies containing the cyclohexane moiety are described in U.S. Pat. Nos. 2,890,194; 2,890,195; 2,890,196; 2,890,197; 2,890,210, 3,023,174 and 3,027,357.

The polyepoxide is typically present in the liquid crosslinkable composition in amounts of about 20.0 to 60.0, preferably from 30.0 to 40.0 percent by weight based on total weight of resinous binder.

The polyacids which are useful in accordance with the teachings of the present invention include two or more acid groups per molecule which are reactive with the polyepoxide. Preferably, the polyacid is a dibasic, tribasic or polybasic carboxylic acid functional compound. The polyacid can generally be aliphatic, cycloaliphatic or aromatic.

For example, and without intending to be limiting, the aliphatic carboxyl compounds useful in accordance with the teachings of the present invention have the general formula: HOOC—$(CH_2)_N$—COOH, wherein n=1–20. Suitable acids include melonic, succinic, adipic, azelaic and sebacic acids, for example.

The cycloaliphatic compounds considered useful in accordance with the teachings of the present invention generally include cycloaliphatic groups having five and/or six membered rings which may be fully saturated or include some degree of unsaturation. Examples include cyclohexane dicarboxylic acid, tetrahydrophthalic acid, alkylhexahydrophthalic acid and dimer fatty acids, among others.

Useful aromatic acids include phthalic acid and isomers, and alkylated phthalic acids, in a non-limiting manner.

Half ester carboxylic acids formed by reacting a polyol with anhydrides can be used. Acrylic polymers having carboxylic acids (obtained by reacting ethylenically substituted acids and other unsaturated monomers) can also be used provided there are more than two acid groups per molecule.

The polycarboxylic acid is typically present in the crosslinkable composition in amounts of about 5.0 to 40.0, preferably from 20.0 to 30.0 percent by weight based on the total weight of the resinous binder. The ratio of epoxy to polyacid is preferably 0.8–1, based on the ratio of epoxy to carboxyl functionality being 0.8:1 to 1:1.

Among the numerous polyisocyanates, otherwise referred to herein as organic isocyanates, which are considered useful are those including aromatic, aliphatic, and cycloaliphatic polyisocyanates and combinations thereof. Examples of such isocyanates may found at columns 8 and 9 of U.S. Pat. No. 4,690,956, herein incorporated by reference.

Representative polyisocyanates are the diisocyanates such as m-phenylene diisocyanate, 2,4-toluene diisocyanate, 2,6-toluene diisocyanate, mixtures of 2,4- and 2,6-toluene diisocyanate, hexamethylene diisocyanate, tetramethylene diisocyanate, cyclohexane-1,4 diisocyanate, hexahydrotoluene diisocyanate (and isomers), naphthalene-1,5-diisocyanate, 1-methoxyphenyl-2,4-diisocyanate, 4,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate and 3,3'-dimethyidiphenylmethane-4,4'-diisocyanate; the triisocyanates such as 4,4', 4"-triphenylmethane triisocyanate, and toluene 2,4,6-triisocyanate; and the tetraisocyanates such as 4,4'-dimethyidiphenylmethane-2,2'-5,5'-tetraisocyanate and polymeric polyisocyanates such as polymethylene polyphenylene polyisocyanate, and mixtures thereof.

Acrylic polymers having polyisocyanates (obtained by reacting ethylenically substituted isocyanates, like TMI, with other unsaturated monomers) can also be used provided there are more than two isocyanate groups per molecule.

In order to increase the shelf life of the said coating composition, and also to make certain that the acid—epoxy reaction takes place prior to isocyanate reaction, blocked isocyanates of the above-mentioned polyisocyanates can also be used. Examples of blocking agents are methyl-ethyl ketoximes, various alcohols and caprolactones, with an unblocking temperature in the baking range of these coatings. "Preferably the isocyanate is present in amounts between about 20 to about 30% by weight based on the weight of the resinous binder."

Optional ingredients in the dual cross-linkable composition include those which are well known in the art such as surfactants, flow control agents, thixotropic agents, fillers, anti-gassing agents, organic co-solvents and catalysts, among others. Examples of such materials as well as suitable amounts of each can be found in U.S. Pat. Nos. 4,220,679; 4,403,003 and 4,147,679 which are hereby incorporated by reference.

The resulting compositions can be applied to the desired substrates by any conventional coating techniques such as brushing, dipping, flowing or, most preferably, spraying. Conventional spray techniques and equipment for air spraying, airless spraying and electrostatic spraying in either manual or automatic methods can be used.

Without intending to be limiting, the following examples are provided to illustrate many of the aforementioned concepts. As will be understood by those skilled in the art, it is preferable that clear coats generally have high acid etch resistance, have a high gloss, high crosslinking as evidenced by MEK double rub values of 150+ according to ASTM D5402 test methods, high hardness of 150+ as measured utilizing a Fisherscope® Microhardness Tester, Model NO. H100V, and good scratch resistance.

EXAMPLES

The following examples relate to the preparation of resinous binders comprising a polyepoxide, a polyacid and a polyisocyanate which are useful in the practice of the present invention.

Example A
A half ester polycarboxylic acid was prepared as follows:

| Ingredients | Weight in grams |
| --- | --- |
| Trimethylolpropane | 474 |
| Methylhexahydrophthalic anhydride | 1771 |
| Xylene | 965 |

Trimethylolpropane and xylene were charged to a reaction vessel and heated to 90° C. under nitrogen atmosphere. Methylhexahydrophthalic anhydride was added under 60 minutes and the temperature increased to 110° C. The mixture was kept at this temperature until IR showed the total disappearance of anhydride peak at 1780 cm-1 (about five hours). The cooled product was diluted with xylene to get a 70% solution of the half ester containing three acid groups for cross linking. The equivalent weight is 210 g/COOH/NV or 300 g/COOH, as a 70% solution.

Example B
An acrylic polymer containing carboxylic acids (Poly acid) was made by the following procedure:

| Ingredients | Weight in grams |
| --- | --- |
| Styrene | 1050 |
| n-Butylacrylate | 250 |
| Acrylic acid | 300 |
| Butylmethacrylate | 400 |
| t-Butylperoxy-2-ethylhexanoate | 100 |
| Xylene | 900 |

Xylene was charged into the reaction vessel and was heated to and maintained at 145° C., and the monomers and the initiator were fed at a constant rate into the reactor during four hours. The reaction was held at this temperature for another two hours, after which the contents were cooled and enough xylene was added to get a polyacrylic at 70% NV, an acid equivalent weight of 480 g/COOH/NV, number average molecular weight of 6000 (measured by Gel Permeation Chromatography) and Tg of 540° C.

Example C
An epoxy containing acrylic polymer (Polyepoxy acrylate) was prepared as follows:

| Ingredients | Weight in grams |
| --- | --- |
| Styrene | 400 |
| Butylmethacrylate | 316 |
| Glycidylmethacrylate | 284 |
| t-Butylperoxy-2-ethylhexanoate | 12 |
| Xylene | 400 |

Xylene was charged into the reaction vessel and heated to and maintained at 140° C., while the monomer mixture and the initiator were fed at a constant rate over four hours. The reaction mixture was kept at 140° C. for another two hours, followed by cooling to room temperature. Enough xylene was added to get polyepoxy acrylate at 70% solids, equivalent weight of 500 g/epoxy,Tg of 60° C. and a number average molecular weight of 10,000.

Example D
An epoxy containing acrylic polymer (Polyepoxy acrylate) was prepared as follows:

| Ingredients | Weight in grams |
| --- | --- |
| Styrene | 140 |
| 2-Ethyl,hexylacrylate | 250 |
| Glycidylmethacrylate | 550 |
| Methylmethacrylate | 110 |
| t-Butylperoxy-2-ethylhexanoate | 50 |
| Xylene | 450 |

Xylene was charged into the reactor vessel and heated to and maintained at 140° C., while the monomer mixture and the initiator were fed at a constant rate over four hours. The reaction mixture was kept at 140° C. for another two hours, followed by cooling to room temperature. Enough xylene was added to get polyepoxy acrylate at 70% solids, equivalent weight of 250 g/EPOXY/NV, Tg of 36° C. and a number average molecular weight of 3000.

Examples 1–8

The following examples show the formulations of clear coats containing the Poly epoxy acrylate and Polyacid from examples A–D and commercially available polyacids and polyisocyanates.

Example 1

The following example shows the formulation of a clear coat containing a dual cross-linked composition comprising polyepoxide, polycarboxylic acid and an unblocked polyisocyanate.

| Ingredient | Parts by weight | % Resin solids |
|---|---|---|
| Polyacid of example B | 68.6 | 39.0 |
| Polyepoxide of example C | 71.4 | 40.6 |
| Polyisocyanate mixture (N3300/T1890) | 36.0 | 20.4 |

The reactants were mixed thoroughly and diluted with MIBK to get a Ford cup viscosity of 20 seconds. This composition was applied over a black basecoat, which has been previously spray applied to a primed steel panel after a 15 minutes flash at room temperature. The panel was cured at 121° C. for 30 minutes to obtain a 1.5 mil high gloss clear film which withstood over 200 MEK double rubs with no marring or film failure. The acid etch test (Morton salt+ fuming sulfuric acid) showed that the clear coat is at least as resistant as a two component polyol: polyisocyanate clear coat. This formulation has to be applied within four hours; overnight, the whole mixture was gelled.

Example 2

The following example shows a single cross-linked clear coat formulation wherein the isocyanate cross-linker used in Example 1 was omitted.

| Ingredient | Parts by weight | % Resin solids |
|---|---|---|
| Polyacid of example A | 31.2 | 30.4 |
| Polyepoxide of example C | 71.4 | 69.6 |

The reactants were mixed thoroughly and diluted with MIBK to get a Ford cup viscosity of 20 seconds. The coating, when cured at 121° C. for 30 minutes, gave a clear film, which did not pass over 30 MEK double rubs. The acid etch (Morton salt and fuming sulfuric acid) showed that the coating would rate as the worst for etching. Also, the film was very soft.

Example 3

In this example, the dual cross-linked system employed a methyl ethyl ketoxime blocked isocyanate mixture was used to increase the shelf stability.

| Ingredient | Parts by weight | % Resin solids |
|---|---|---|
| Polyacid of example B | 70.0 | 36.7 |
| Polyepoxide of example C | 71.4 | 37.4 |
| Polyisocyanate mixture Blocked (N3300/T1890) | 49.5 | 25.9 |

The reactants were mixed thoroughly and diluted with MIBK to get a Ford cup viscosity of 20 seconds. As before, the formulation was spray applied to black basecoated panels and cured at 143° C. for 30 minutes. The resulting clear coat was a clear film with high gloss, withstanding over 200 MEK double rubs, high acid etch resistance (Morton salt+fuming sulfuric acid) and a high microhardness reading of 210.

Example 4

In this example, a soft Polyacid was used.

| Ingredient | Parts by weight | % Resin solids |
|---|---|---|
| Trimer fatty acid | 30.0 | 20.2 |
| Polyepoxide of example C | 68.6 | 46.3 |
| Polyisocyanate mixture Blocked(N3300/T1890) | 49.5 | 33.5 |

The reactants were mixed thoroughly and diluted with MIBK to get a Ford cup viscosity of 20 seconds. This formulation, when cured at 143° C. for 30 minutes, gave a very good film which withstood over 200 MEK double rubs. The microhardness and the acid etch test results were not as good as for the foregoing example. Interestingly, when the same formulation was used without the isocyanate crosslinker, i.e. under a single cross-linked system, the film formed was very soft, failing at 20 MEK double rubs.

Example 5

In this example another dimer acid of low equivalent weight was used:

| Ingredient | Parts by weight | % Resin solids |
|---|---|---|
| HHMPA* | 9.2 | 7.1 |
| Polyepoxide of example C | 70.0 | 54.4 |
| Polyisocyanate mixture Blocked(N3300/T1890) | 49.5 | 38.5 |

*Hexahydromethylphthalic acid

The reactants were mixed thoroughly and diluted with MIBK to get a Ford cup viscosity of 20 seconds. The film, when cured at 143° C. for 30 minutes, had good appearance with over 200 MEK double rubs and high acid etch resistance. The microhardness was somewhat disappointing at 100.

Example 6

In this example, a soft polyacid was used with a lower equivalent epoxide in the dual cross-linked system.

| Ingredient | Parts by weight | % Resin solids |
|---|---|---|
| Trimer fatty acid | 30.0 | 26.3 |
| Polyepoxide of example D | 35.2 | 30.8 |
| Polyisocyanate mixture Blocked(N3300/T1890) | 49.0 | 42.9 |

The reactants were mixed thoroughly and diluted with MIBK to get a Ford cup viscosity of 20 seconds. The film, when cured at 143° for 30 minutes, appearance was good and it withstood over 200 MEK double rubs. While the film appeared to be good for scratch resistance, the microhardness was 60 and the acid etch test was poor, theoretically, as the result of employing a soft polyacid as further illustrated in the previous examples.

Example 7

In this example, a low equivalent weight diacid was used instead of a soft polyacid, along with a low equivalent weight epoxide.

| Ingredient | Parts by weight | % Resin solids |
|---|---|---|
| HHMPA* | 9.2 | 9.8 |
| Polyepoxide D | 35.2 | 37.6 |
| Blocked(N3300/T1890) | 49.2 | 52.6 |

*Hexahydromethylphthalic acid

The reactants were mixed thoroughly and diluted with MIBK to get a Ford cup viscosity of 20 seconds. The clear film obtained by curing at 141° C. for 30 minutes withstood over 200 MEK double rubs, but showed slight marring. Importantly, however, the etch ratings were high and microhardness of 219.

Example 8

In this example, same components as example 7 were used, except that the cross linker was changed to melamine-formaldehyde—HMMM.

| Ingredient | Parts by weight | % Resin solids |
|---|---|---|
| HHMPA* | 9.2 | 16.9 |
| Polyepoxide D | 35.4 | 65.1 |
| HMMM** | 9.8 | 18.0 |

*Hexahydromethylphthalic acid
**Hexamethoxymethylmelamine

The reactants were mixed thoroughly and diluted with MIBK to get a Ford cup viscosity of 20 seconds. The film, which was cured at 121° C. for 30 minutes, was clear and was good for 100 MEK double rubs. The microhardness was acceptable at 150, but the composition gave rise to less than desirable scratch and acid etch resistance.

SUMMARY OF EXAMPLES

| Example | WPE | Acid | Sec.-Cross-linker | Acid Etch # | MEK rubs | Hardness | Scratch/Mar |
|---|---|---|---|---|---|---|---|
| 1 | 500 | Polyacid (480) | Unblocked NCO | 0 | 200 | N.A. | No mar |
| 2 | 500 | Polyacid (480) | — | 5 | <30 | N.A. | Soft Film |
| 3 | 500 | Poly acid (480) | Blocked NCO | 0–1 | 200 | 209 | Slight Scratch |
| 4 | 500 | TFA (300) | Blocked NCO | 5 | >200 | 60 | No Scratch |
| 5 | 500 | HHMPA (92) | Blocked NCO | 1 | 100 | 128 | Low scratch |
| 6 | 250 | TFA (300) | Blocked NCO | 4 | >200 | 62 | No scratch |
| 7 | 250 | HHMPA (92) | Blocked NCO | 2 | 200 | 219 | Mar |
| 8 | 250 | HHMPA (92) | Melamine | 3 | 100 | 152 | Scratch |

Cure conditions: 30 min. at 143° C. (except for 1, 2, 8 which was 30 minutes at 121° C.)
0 = Best and 5 = Worst When a coatings composition made of polyepoxide, polycarboxylic acids and polyisocyanates is applied within four hours of mixing over the substrates and baked at 121° F. for 30 minutes, it will produce a clear, hard surface with high gloss, hardness and etch resistance. Further, as is illustrated based on the foregoing examples, the dual cross-linked systems of the present invention out-performed each of the single cross-linked systems on the whole.

This coating composition can be applied as either one component or two component system. For two component system, the stability window of four hours is not an issue because two components are mixed at the time of spray inside the spray gun. This provides lower cost and better scratch resistance than conventional two component system.

For one component system, the blocked polyisocyanates are essential for stability, but it requires higher cure temperature.

While it will be apparent that the preferred embodiments of the invention disclosed are well calculated to fulfill the objects stated, it will be appreciated that the invention is susceptible to modification, variation and change without departing from the spirit thereof.

What is claimed is:

1. A clear coat composition containing an organic solvent and a resinous binder, said resinous binder consisting essentially of:
   a) a polyepoxide which is the reaction product of an ethylenically unsaturated monomer having at least one epoxy group and alkyl esters of acrylic and methacrylic acid containing from 1 to 20 carbon atoms in the alkyl group and excluding acid group-containing copolymerizable ethylenically unsaturated monomers, crosslinked with
      (i) a polyacid; and
      (ii) a polyisocyanate;
   wherein the equivalent ratio of epoxy groups of the polyepoxide to carboxyl groups of the polyacid is from 0.8:1 to 1:1 and wherein said resinous binder exhibits both ester and urethane crosslinking.

2. The clear coat composition of claim 1, wherein said polyacid includes a carboxyl terminated polyester having at least two carboxyl groups per molecule.

3. The clear coat composition of claim 1, wherein said polyepoxide is a copolymer of ethylenically unsaturated epoxide with acrylates, methacrylates, or styrene, and mixtures thereof.

4. The clear coat composition of claim 1, wherein said polyepoxide is present in amounts between about 30% to about 40% by weight based on the weight of the resinous binder.

5. The clear coat composition of claim 1, wherein said polyacid is present in amounts between about 20% to about 30% by weight based on the weight of the resinous binder.

6. The clear coat composition of claim 1, wherein said polyisocyanate is present in amounts between about 20% to about 30% by weight based on the weight of the resinous binder.

* * * * *